United States Patent
Coutant (12)

(10) Patent No.: US 6,293,712 B1
(45) Date of Patent: Sep. 25, 2001

(54) METHOD AND APPARATUS FOR CONSTRUCTING A STACK UNWIND DATA STRUCTURE

(75) Inventor: Cary A. Coutant, Saratoga, CA (US)

(73) Assignee: Institute for the Development of Emerging Architectures, LLC, Cupertino, CA (US)

( * ) Notice: Subject to any disclaimer, the term of this patent is extended or adjusted under 35 U.S.C. 154(b) by 0 days.

(21) Appl. No.: 08/941,885

(22) Filed: Sep. 30, 1997

(51) Int. Cl.$^7$ ........................................ G06F 9/45
(52) U.S. Cl. ..................... 395/704; 395/705; 712/228
(58) Field of Search ..................... 395/704, 182.13, 395/183.11, 705; 712/228

(56) References Cited

U.S. PATENT DOCUMENTS

| | | | |
|---|---|---|---|
| 5,327,566 | 7/1994 | Forsyth | 395/775 |
| 5,428,779 | 6/1995 | Allegrucci et al. | 395/650 |
| 5,530,870 | * 6/1996 | De Bruler . | |
| 5,535,397 | 7/1996 | Durante et al. | 395/740 |
| 5,564,031 | 10/1996 | Amerson et al. | 395/419 |
| 5,628,016 | * 5/1997 | Kukol . | |
| 5,640,582 | 6/1997 | Hayes et al. | 395/800 |

OTHER PUBLICATIONS

"RISC systems", *Microprocessors and Microsystems*, Daniel Tabak, vol. 12, No. 4, May 1988, pp. 179–185.
"A Simple Interprocedural Register Allocation Algorithm and Its Effectiveness for LISP", *amc Transactions on Programming Languages and Systems*, Peter A. Steenkiste and John L. Hennessy, vol. 11, No. 1, Jan. 1989, pp. 1–32.
"A VLSI RISC", *Computer*, David A. Patterson and Carol H. Sequin, vol. 15, No. 9, Sep. 1982, pp. 1–21.
"Hewlett–Packard, Chapter 7 Stack Unwinding from Chapter 6 Millicode Calls", PA–RISC Procedure Calling Conventions Reference Manual (Palo Alto CA: Hewlett–Packard, 1986).
"The 32–bit PA–RISC Run–Time Architecture Document", HP–UX 10.20, Version 3.0, Hewlett–Packard Company, 1985–1997.
"64–Bit Runtime Architecture for PA–RISC 2.0", Version 3.3, Oct. 6, 1997, Hewlett–Packard Company.

* cited by examiner

*Primary Examiner*—John W. Cabeca
*Assistant Examiner*—George Lawrence Opie
(74) *Attorney, Agent, or Firm*—Blakely, Sokoloff, Taylor & Zafman, LLP (57) ABSTRACT

A computer-implemented method of constructing a stack unwind data structure is described. In one embodiment, the method commences when a procedure, which comprises part of the computer program, is compiled. The stack unwind data structure construction commences with determining whether the called procedure complies with a default condition for a predetermined characteristic. For example, it may be determined whether a stack frame for the procedure is of a fixed or variable size, with a fixed size stack frame comprising a default condition. If the procedure does not comply with, or varies from, the default condition for this predetermined characteristic, then an unwind record for the procedure is generated, and included within an entry associated with the procedure in the stack unwind data structure. Alternatively, should the procedure comply with the default condition, this unwind record is not generated and accordingly not included within the stack unwind data structure. The method accordingly allows for the construction of a compact stack unwind data structure.

9 Claims, 7 Drawing Sheets

METHOD AND APPARATUS FOR CONSTRUCTING A STACK UNWIND DATA STRUCTURE

FIELD OF THE INVENTION

The present invention relates generally to conventions for compiling, linking and executing a computer program on an operating system. Specifically, the present invention relates to the conventions for call stack unwinding and exception handling within a computer system.

BACKGROUND OF THE INVENTION

Computer programs are typically composed of a number of procedures, each of which may be called upon to perform a certain function, or process certain data, upon execution of the computer program. In conventional programming languages, procedures called when the computer program executes may each be represented by a "stack frame" in a defined region of a program's address space, the defined region being termed the "stack region".

Figure 1:
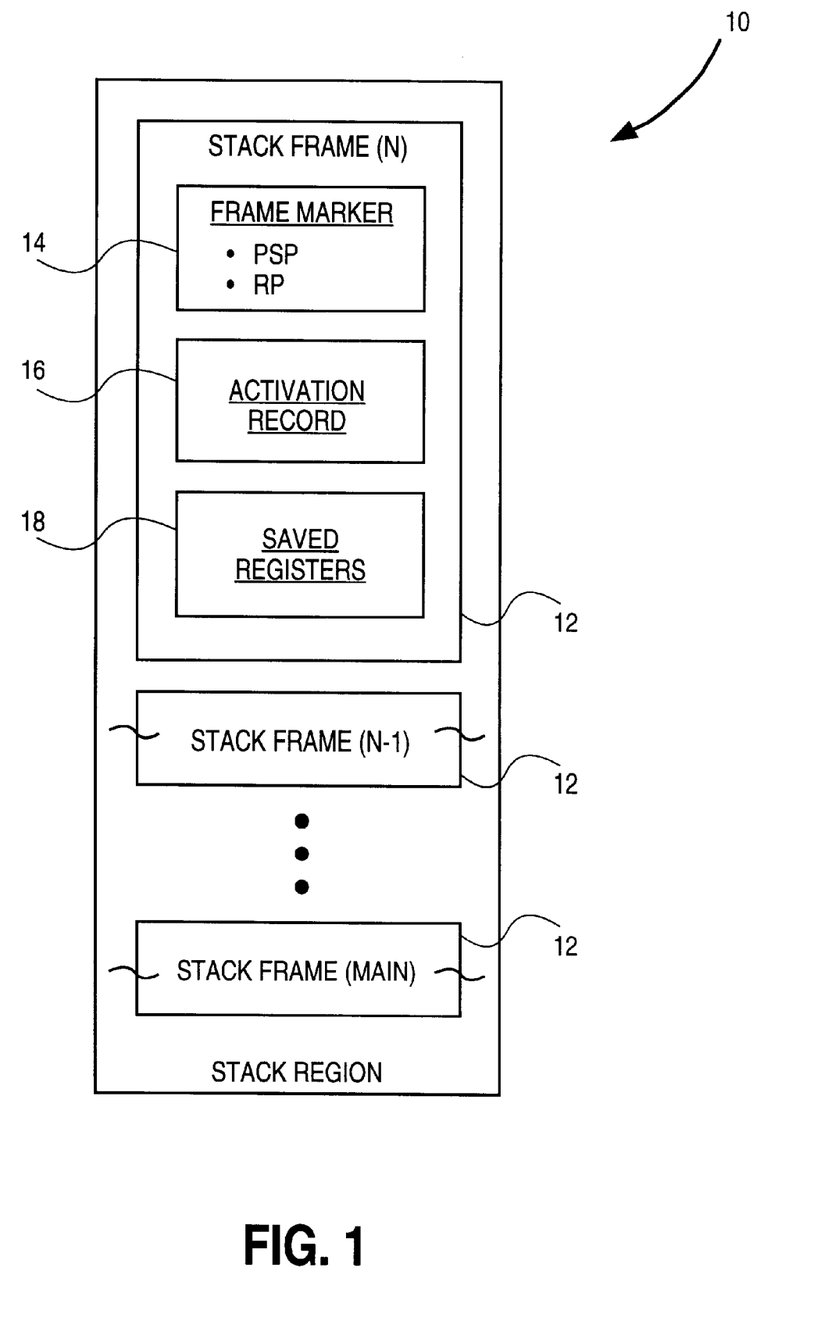
FIG. 1 is a schematic representation of a stack region defined in a computer program's address space.

Referring to FIG. 1, there is shown a schematic representation of a stack region 10 defined in a program's address space. The stack region 10 accommodates a call stack comprising N stack frames 12, each stack frame 12 representing and including data concerning a specific called procedure. A stack frame 12 is created and placed in the call stack when an associated procedure is called, and then removed (or "popped") from the call stack when the procedure is exited. Accordingly, the call stack represents a structure of nested procedures which are extant within a computer system at any given moment. For example, in the situation illustrated in FIG. 1, the procedure associated with stack frame (N−1) would have called the procedure associated with stack frame (N).

Each stack frame 12 may include a frame marker 14, an activation record 16, and saved registers 18. The frame marker 14 is located at the top of the stack frame 12, and may include "bookkeeping" information, such as a pointer to the immediately preceding stack frame (i.e. a Previous Stack Pointer (PSP)) and a pointer to the return point in the calling procedure (i.e. a Return Pointer (RP)). The activation record 16 includes information concerning the local state that must be stored in memory by the associated procedure, including local variables and tempories. Each stack frame 12 also includes space to save registers that must be saved across procedure calls.

Stack unwinding is the process of tracing backwards through the activation records contained in a call stack. Debuggers and exception handling mechanisms require the ability to "unwind" the call stack, or trace back through a series of stack frames, from the stack frame for the most recently called procedure to that for the outermost procedure of a program. For example, a debugger may need to unwind the call stack to print a stack trace, while an exception handling mechanism may need to remove a number of stack frames from the call stack, and to transfer control to an exception handling routine which is located down the stack. As the stack is unwound, values of preserved registers, saved by each procedure, are recovered so as to allow the debugger or exception handler access to correct values for local variables.

Complex Instruction Set Computing (CISC) and Reduced Instruction Set Computing (RISC) architectures have fundamentally differing approaches to stack frames. CISC architectures typically provide special instruction-set support for the stack mechanism, with a single instruction to allocate a stack frame and to create a frame marker when a procedure is called, and another single instruction to return from a procedure call and to remove the relevant stack frame from the call stack.

The advent of RISC architectures allowed the allocation, creation, return and removal steps to be divided into a number of higher resolution sub-operations, which can be eliminated when unnecessary. For example, where it is known that the size of the stack frame is not varied by the associated procedure, there is no need to save the Previous Stack Pointer (PSP), and both save and retrieve operations with respect to the PSP can be eliminated.

However, in RISC architecture environments, the debugger may now need additional information to perform a stack unwind operation in view of the non-uniform content and formats of stack frames. For example, for any given stack frame, a PSP may or may not be included in the relevant frame marker. If the PSP is saved, the debugger can immediately locate the previous stack frame; if not, the debugger needs to determine the size of the stack frame and then calculate the location of the preceding stack frame. An exception handler may also require additional information regarding what registers have been saved in a stack frame, and when and where these registers were saved.

In order provide this additional information required in RISC architectures, a stack unwind table may be generated by a compiler. Such a stack unwind table includes static information that is required for unwinding the stack. It is desirable that a stack unwind table be as compact as possible, and also facilitate optimization techniques to be applied to procedure code without compromising the ability to unwind the stack.

SUMMARY OF THE INVENTION

According to a first aspect of the invention, there is provided a computer-implemented method of constructing a stack unwind data structure. The method commences with a determination as to whether a specific procedure complies with a default condition for a certain characteristic. If the procedure does not comply with, or varies from, the default condition for this predetermined characteristic, then an unwind record relating it to the predetermined characteristic is generated and included in the stack unwind data structure. Alternatively, should the procedure comply with, or correspond to, the predetermined characteristic, then an unwind record is not generated, and not included in the stack unwind data structure. The above operations are, in one exemplary embodiment, performed during compilation of a program.

According to a second aspect of the invention, there is provided a computer-implemented method of performing a stack unwind operation utilizing a stack unwind data structure. The method of performing the stack unwind requires first determining whether an entry for a specific procedure is included in the stack unwind data structure. Should such entry be included within the stack unwind data structure, then a determination is made to whether a record relating to a first predetermined characteristic is included within the entry. Should no such record be included within the entry, then a first default condition is attributed to the predetermined characteristic. Further, should no entry for the procedure be included within the stack wind data structure, then a default condition is attributed to a further predetermined characteristic.

According to a third aspect of the invention, there is provided a computer-readable medium having a sequence of instructions stored thereon which, when executed by a processor, cause the processor to perform the steps outlined above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for constructing a compact stack unwind data structure are described. In the following description, for purposes of explanation, numerous specific details are set forth in order to provide a thorough understanding of the present invention. It will be evident, however, to one skilled in the art that the present invention may be practiced without these specific details.

Procedure Structures

A procedure included within a computer program may be viewed as comprising a number of regions. Specifically, a procedure may be divided into a "prologue" region and a "body" region. The prologue region is where stack frames are established and key registers are saved. In order to unwind correctly when the Instruction Pointer (IP) points to a location in a prologue region, an unwinder requires a detailed description of the order of operations in this region. The body region does not vary the state of a stack frame, and does not save any further preserved registers.

Stack Unwind Data Structures

A stack unwind table may assume various forms and configurations. A first form of stack unwind table may comprise a single record for each procedure, with the following three fields in each record:

1. the starting address of an associated procedure;
2. the ending address of an associated procedure; and
3. the address of the end of the prologue code in an associated procedure.

Using the address at the end of the prologue code, a debugger can emulate the prologue in reverse order to obtain the necessary information, and to determine required values directly from identified registers. This first form of unwind table is characterized in that the unwind table is relatively small, and the compiler is provided with some degree of flexibility.

A second form of stack unwind table may also comprise a single record for each procedure, but each record includes four fields, namely:

1. the starting address of an associated procedure;
2. the ending address of an associated procedure;
3. a set of flags; and
4. a frame size.

The flags identify to a debugger how preserved registers have been saved in the call stack, and whether or not the frame marker includes a Previous Stack Pointer (PSP). If there is no PSP, a fourth field identifies the frame size, from which the location of a preceding stack frame can be calculated. This second form of unwind table does not require reverse emulation, which may translate into a reduction in the amount of code contained in unwind routines.

Figure 2:
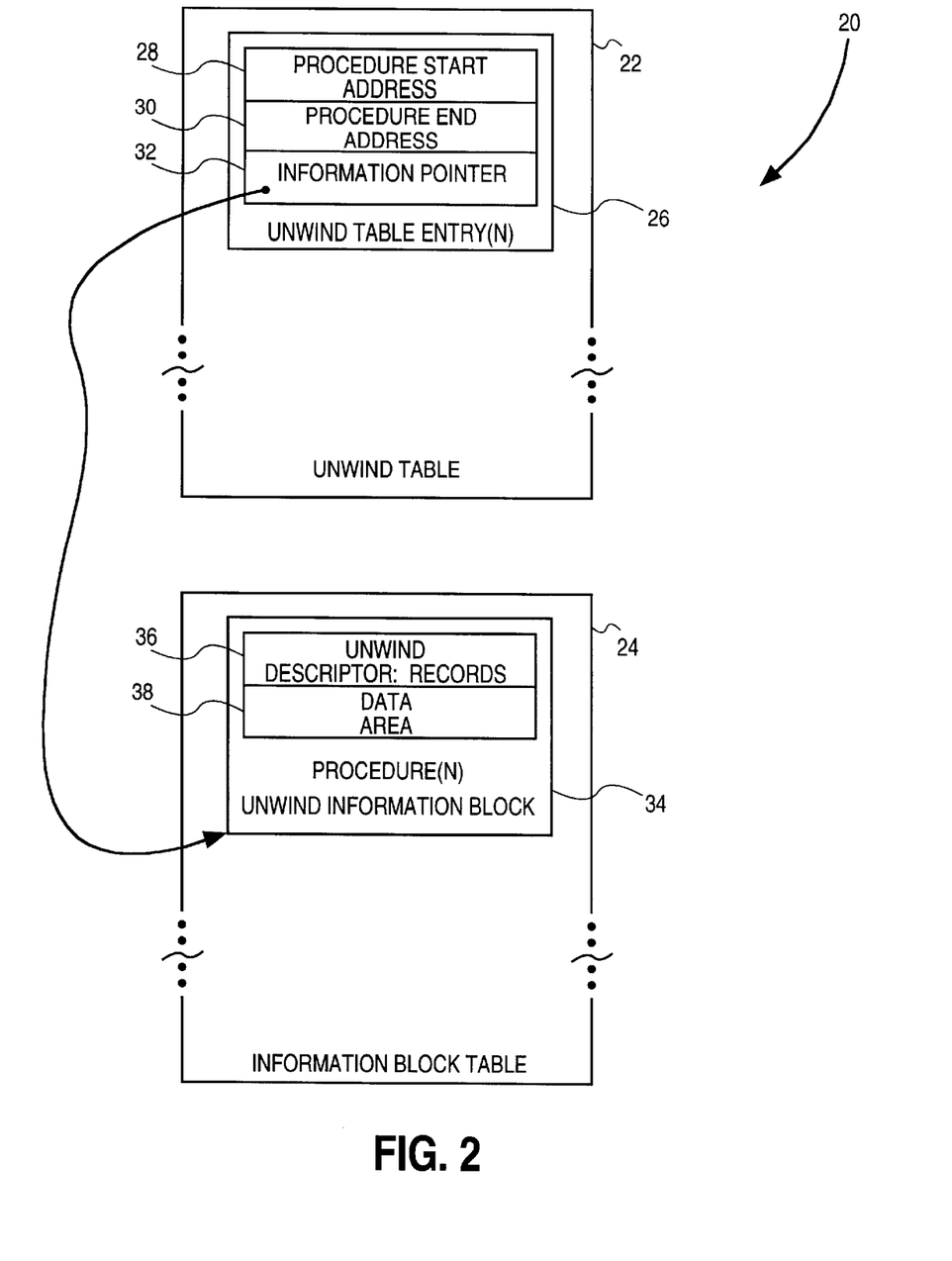
FIG. 2 is a schematic representation of a stack unwind data structure which may be constructed according to the teachings of the present invention.

A further form of stack unwind data structure 20, according to one embodiment of the present invention, is shown in FIG. 2. The stack unwind data structure 20 comprises a two-level structure in the form of a unwind table 22 and an information block table 24. The unwind table 22 includes an unwind table entry (or record) 26 for each active procedure, each entry 26 comprising three fields, namely:

1. a procedure start address 28;
2. a procedure end address 30; and
3. an information pointer 32.

Each of the above fields has a length of one double word. The information pointer 32 points to a variable-size unwind information block (UIB) 34 contained within the information block table 24. The UIB 34, in turn, includes a collection of unwind descriptor records 36 pertaining to the relevant procedure, and a data area 38. The present invention proposes a method of constructing a stack unwind data structure 20 in a compact manner, and in such a way so as to facilitate use with sophisticated software optimization techniques.

Unwind Descriptor Records

Figure 3:
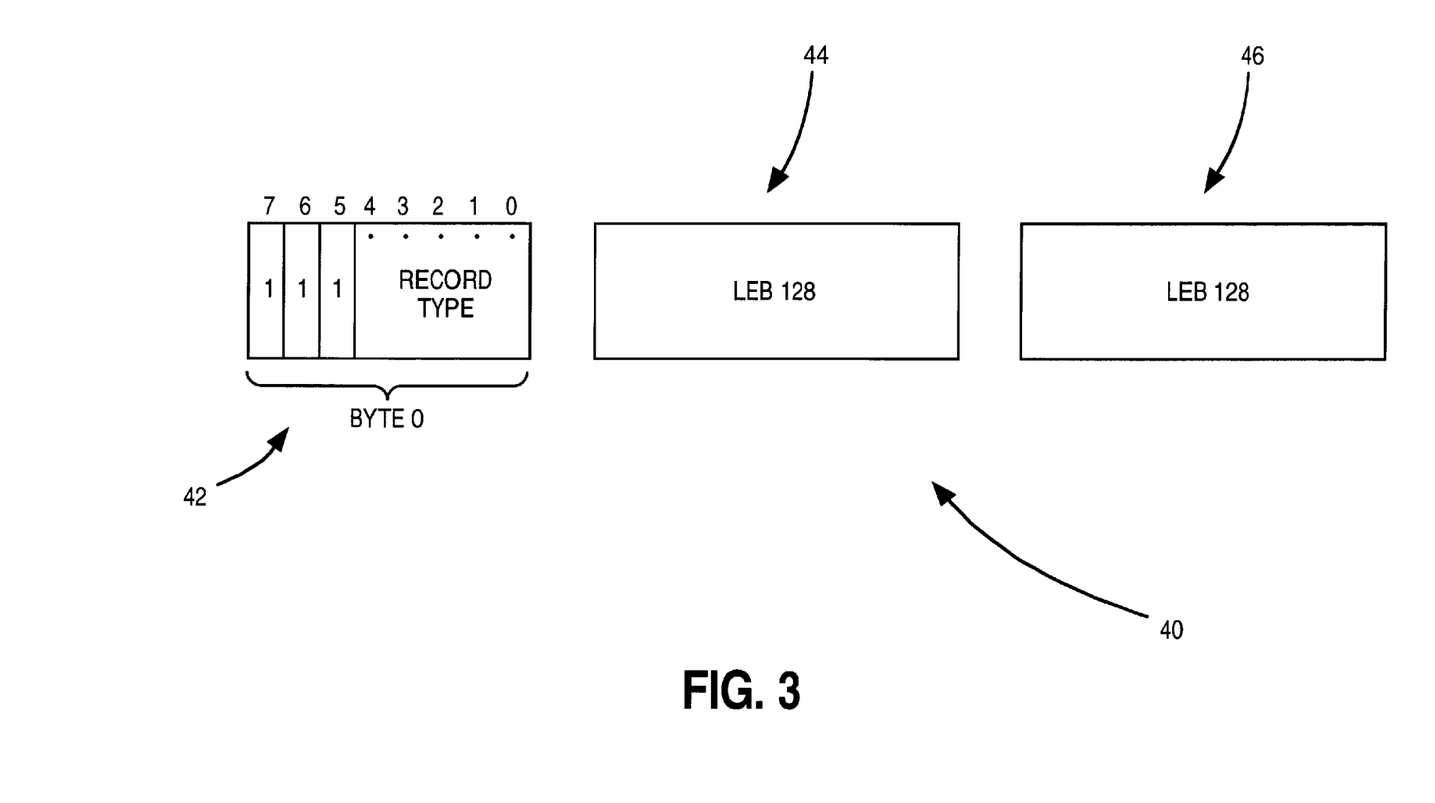
FIG. 3 is a schematic representation of a descriptor record which may be constructed according to the present invention.

The unwind descriptor records 36 comprise a contiguous sequence of records describing the unwind regions of an associated procedure, and are encoded in variable-length byte strings. An illustrative example of a single descriptor record 40 is shown in FIG. 3. Each unwind descriptor record 40 may be classified as being either a region header descriptor, a prologue region descriptor record or a body region descriptor record. Each group of records begins with a region header descriptor, followed by any number of descriptor records that supply the required additional unwind information about the region. It will be appreciated that, in order to maintain a compact information block table 24, it is desirable to include a minimum number of unwind descriptor records 36 in any one UIB 34. It is also desirable that the descriptor records 36 themselves be encoded in as compact a manner as possible.

Referring again to FIG. 3, the exemplary descriptor record 40 includes a first byte 42 from which both the record format and length are discernible. The high-order bit of byte 42 determines whether it is a header record (e.g. when this bit is set to 0) or a descriptor record (e.g. when this bit is set to 1). The record type (or format) is defined in the remaining bits of byte 42.

The descriptor record 40 is further shown to include two further variable-length fields 44 and 46. The fields 44 and 46 are encoded according to the Little-Endian Base 128 (LEB 128) encoding scheme. Fields in the LEB 128 format follow fixed fields and begin on a byte boundary. The fields 44 and 46 may contain any information pertaining to an associated procedure. For example, the field 46 may indicate the size of a fixed-size memory stack frame.

As the record type is easily decoded, and all descriptor records begin on a byte boundary, encoding and decoding is simplified. It will be appreciated that the descriptor record illustrated in FIG. 3 is merely exemplary, and numerous other record formats may be utilized to realize the present invention. According to one embodiment of the invention, a number of prologue descriptor records are formatted according to the example provided in FIG. 3. Examples of the descriptor records are provided below in Table 1:

TABLE 1

| RECORD TYPE | DESCRIPTION |
| --- | --- |
| mem_stack_f | Specifies a fixed-size memory stack frame, when the stack pointer (SP) is modified, and the size of the frame. |
| mem_stack_v | Specifies a variable-size memory stack, and when the Previous Stack Pointer (PSP) is saved. |
| rp_when | Specifies when the Return Pointer (RP) is saved. |
| spill_base | Specifies a base of a spill area in a memory stack, as PSP-relative offset. |

A number of descriptor records 36 may be defined to describe various characteristics pertaining to an associated procedure. For example, prologue descriptor records may be defined to described a time when a particular action occurs, the size of a stack frame (as per the examples provided in Table 1), a general register that is used for preserving the value of a specific register or any other pertinent information required for successful unwind of the call stack. By defining a complete set of record types, a large degree of flexibility can be imparted to the unwind mechanism. For example, the Return Pointer (RP), the Previous Stack Pointer (PSP) and other critical values may each be preserved in a number of different locations, and the values may be saved in any order within the prologue of a procedure. A procedure may also consist of an alternating sequence of prologue and body regions, allowing a compiler to "shrink-wrap" certain register saves and restores inside less frequently executed conditional paths within a procedure.

Methodology

Figure 4:
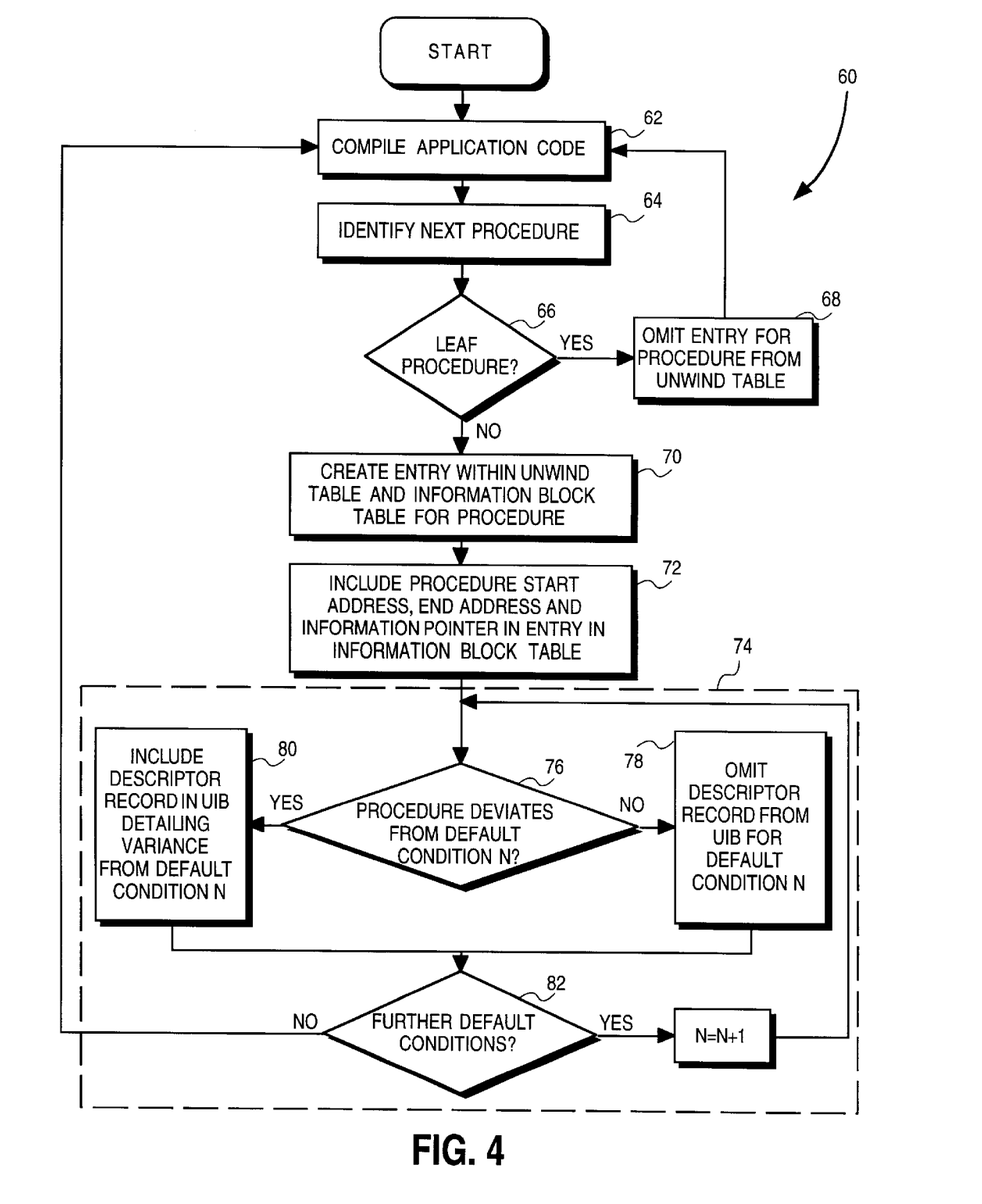
FIG. 4 is a flow chart illustrating a method, according to the present invention, of constructing an unwind data structure.

The process of unwinding the call stack begins with an initial "context record" describing the process (or thread) state in the most recent procedure activation at the point of interruption. From here, the call stack is unwound one stack frame at a time, utilizing static information concerning the relevant procedure, as contained in the UIB 34, for that procedure. The static information, including the unwind descriptor records 36 as described above, are generated by the compiler to help it reconstruct a so-called "context record" describing the previous procedure. As stated above, it is desirable that the UIB 34 for each procedure be compact. Referring to FIG. 4, there is shown a flow chart illustrating one embodiment of a method 60, according to the present invention, of constructing an unwind data structure in a compact manner. While the exemplary method 60 is described as constructing the unwind data structure 20, shown in FIG. 2, it will be appreciated that the invention may be applied to construct any number of alternative data structures.

The method 60 commences at step 62 with the compilation of the program code. At step 64, a procedure is identified, at which time construction of an unwind data structure begins. At decision box 66, a determination is made as to whether the identified procedure is a so-called "leaf" procedure. A leaf procedure is defined as a procedure that executes to completion, and then exits, without calling any further procedures. Such a procedure is thus regarded as being a "leaf" on a tree showing a nested procedure structure. As a leaf procedure does not call any further procedures, there is no need to store local variable values in a location other than in the working registers in which they reside, nor is it necessary to store other static information concerning the leaf procedure elsewhere. In an alternative embodiment, a determination is made at decision box 66 whether a memory stack frame is absent for the identified procedure.

Returning to the illustrated embodiment, if the procedure is identified as being a leaf procedure, the method proceeds to step 68, and an entry for the procedure is not included within the unwind data table 22. Thereafter the method 60 returns to step 62.

Alternatively, should the procedure not be a leaf procedure, the method 60 proceeds to step 70 where an entry 26, as illustrated in FIG. 2, is created in an unwind table 22. At step 72, the start and end addresses 28 and 30 of the procedure are stored in the entry 26, and a pointer to a UIB 34, in an information block table 24, is created.

The method 60 then enters a descriptor record creation cycle 74, in which descriptor records 36 are created and stored in the UIB 34 for the procedure. In summary, the creation cycle 74 cycles through N default conditions for N characteristics, and determines whether the procedure deviates from or conforms to each of these N default conditions. Merely for example, the N characteristic may relate to the time when a particular action occurs with respect to the stack frame, the size of the stack frame, or any other information pertinent to the unwinding of the stack. If there is a variance from any of the N default conditions, a descriptor record detailing that variance is created and stored in the UIB 34. Specifically, the cycle 74 commences at step 76 with a determination of whether the procedure conforms to or deviates from a default condition N. If the procedure conforms to default condition N, a descriptor record pertaining to the default condition is omitted from the UIB 34 at step 78. Alternatively, should the procedure deviate from the default condition, a descriptor record detailing this variance is generated, and included within the UIB 34 at step 80. From steps 78 and 80, the method 60 proceeds to decision box 82. If the procedure must be examined for compliance with further default conditions, the method 60 returns to step 76. If all default conditions have been scrutinized, then execution of the program code continues at step 62.

The method 60 is advantageous in that it allows for the creation of a compact stack unwind data structures. Firstly, the omission of entries for leaf procedures from the unwind data structure provides a degree of compaction. Secondly, the creation and storage of descriptor records to describe only variations from predetermined and often-occurring default conditions also allows for the creation of a compact UIB 34. The default conditions are selected to be commonly occurring conditions, and descriptor records are thus only required to record unusual circumstances resulting from advanced optimization of code performed by the compiler.

Figure 5:
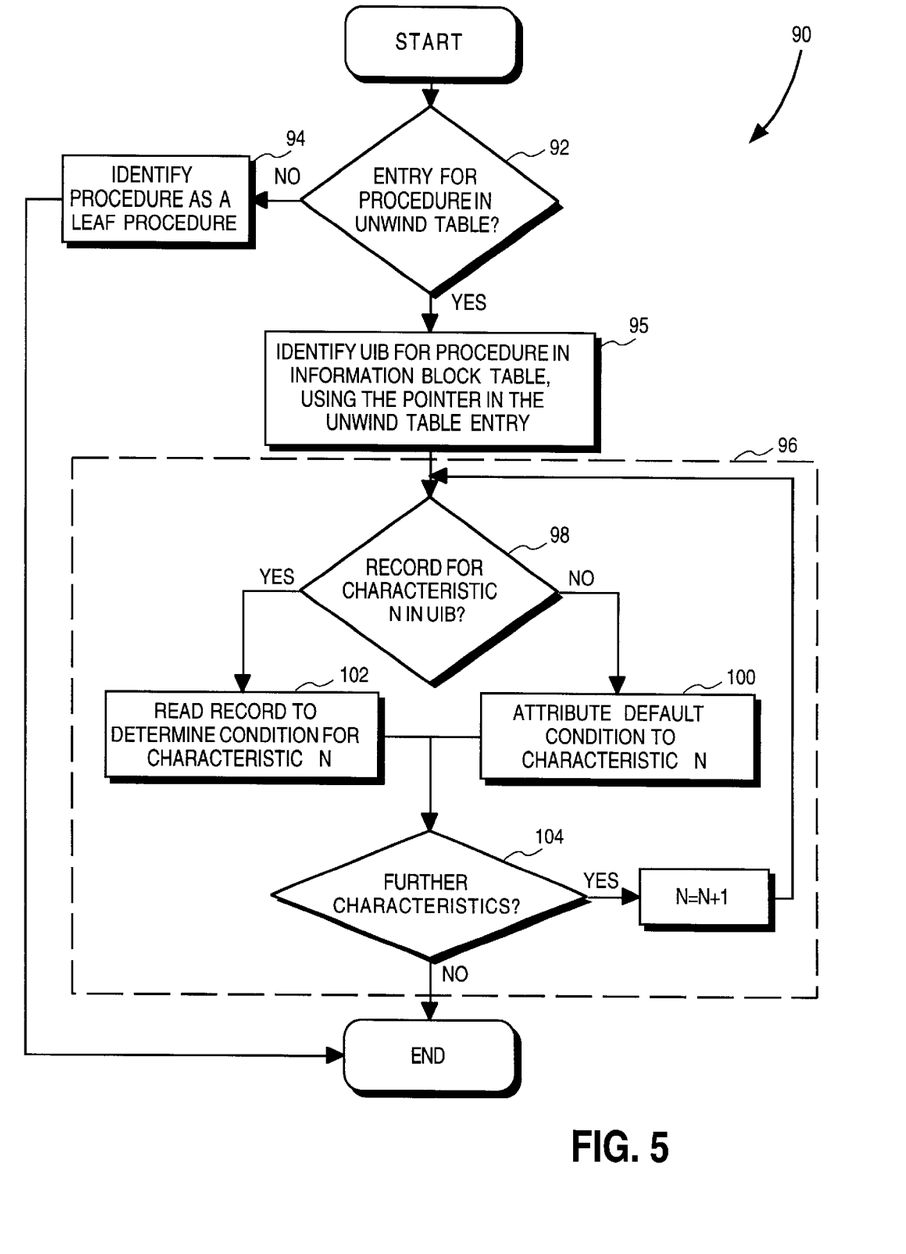
FIG. 5 is a flow chart illustrating a method, according to the present invention, of performing a stack unwind operation utilizing a stack unwind data structure.

FIG. 5 illustrates one embodiment of a method 90, according to the present invention, of performing a stack unwind utilizing a stack unwind data structure. In the described exemplary embodiment, the stack unwind data structure conforms to the structure 20 illustrated in FIG. 2, and created by the method 60 described above with reference to FIG. 4. The method 90 commences at decision box 92, where a determination is made as to whether there is an entry in an unwind table 22 for a procedure under examination. If not, the procedure is identified as a leaf procedure at step 94. If an entry does exist, the method 90 proceeds to step 95, where a UIB 34 for the procedure is identified utilizing the pointer information 32 in the unwind table entry 26. The method 90 then enters a characteristic (or attribute) determination cycle 96, in which the required unwind information for the procedure is determined. At decision box 98, a determination is made as to whether a descriptor record 36 for a specific characteristic, attribute or feature of the procedure exists within the UIB 34. If not, at step 100, the characteristic, attribute or feature is assumed to comply with a default condition, and a predetermined value or content is attributed to the characteristic. On the other hand, should a descriptor record exist within the UIB 34, this descriptor record is read at step 102 to determine the condition of the characteristic. The method 90 proceeds from steps 100 and 102 to decision box 104. If further unwind information for the procedure under examination is required, there is a return to step 98. If not, the method 90 terminates.

Figure 6:
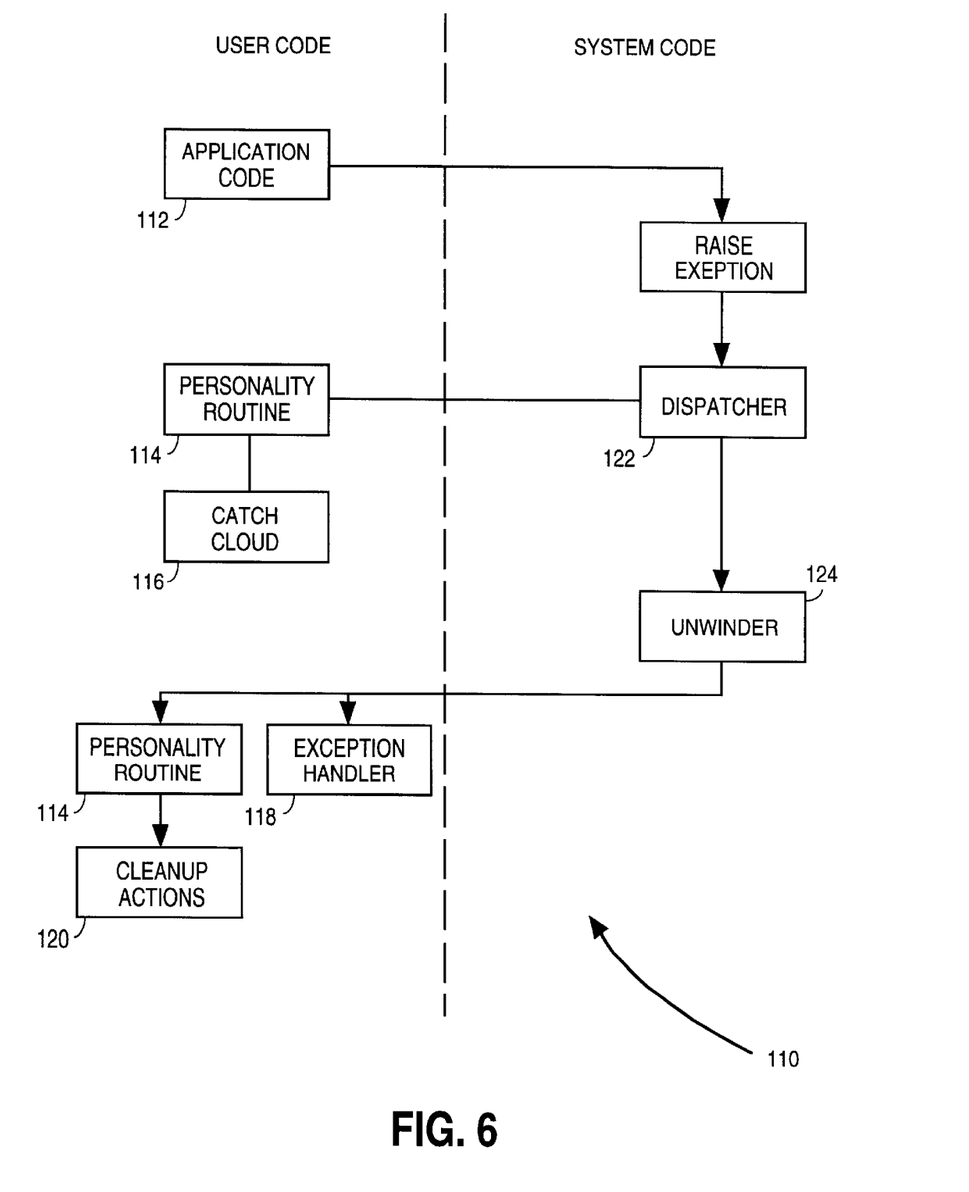
FIG. 6 is a block diagram illustrating the various components of an exception handling mechanism, including an unwinder which operates according to the teachings of the present invention.

FIG. 6 illustrates the various components of an exception handling mechanism 110. The various components comprise either user code or system code. The user code includes program code 112, a personality routine 114, a catch clause 116, an exception handler 118, and cleanup actions 120. The system code includes a dispatcher 122 and an unwinder 124, which operates according to the method 90 as described above.

Figure 7:
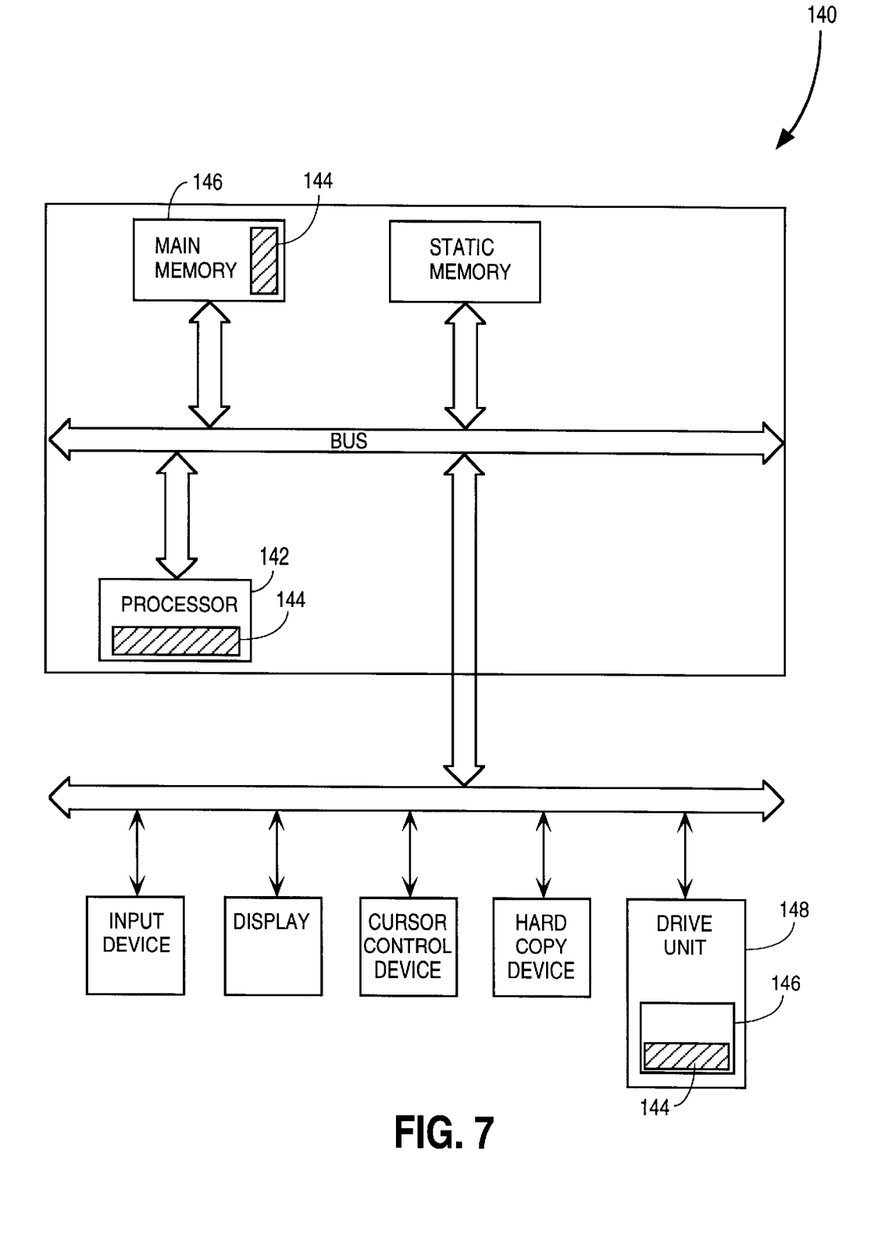
FIG. 7 is a schematic representation of a computer system which may, under the direction of a sequence of instructions, perform the methodologies of the present invention.

FIG. 7 shows a computer system 140 in which code 144, under the direction of which the computer system 140 performs the methodology of the present invention as described above with reference to FIGS. 4 and 5, is stored. The various steps described above are performed by a processor 142 of the computer system 140 under direction of the code 144. During execution, the code 144 at least partially resides in a main memory 146 of the computer 140, as shown in FIG. 7.

In one embodiment, the code 144 may also reside on a computer-readable medium 146 (such as a magnetic tape or disk, or an optical disk). In this case, the computer-readable medium 146 is receivable within a drive unit 148 which is able to read the sequences of instructions comprising the code 144 from the computer-readable medium 146, and to propagate these instructions to the main memory 146 and/or the processor 142. For the purposes of this specification, the term "computer-readable medium" shall also be taken to include any storage or memory resource capable of storing a computer program. Accordingly, the term shall also be taken to refer to static memory, main memory or any other memory within a computer or network device.

It will of course be appreciated that the computer 140 shown in FIG. 7 is capable of operating as both a server and a client network device. As such, the code 144 may be read from the computer-readable medium 146 for the purpose of propagation and distribution from the computer 140 to a further computer system.

The present invention is advantageous in that it allows for the construction of a compact UIB 34, and consequently a compact information block table 24 and unwind data structure 20. It also provides sufficient flexibility to allow sophisticated optimization techniques to be applied to a procedure prologue, without compromising the ability to unwind the stack.

Thus, a method and apparatus for constructing a compact stack unwind data structure have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of constructing a stack unwind data structure, the method including:
    determining whether a procedure within a computer program is a leaf procedure;
    if the procedure is not a leaf procedure, then:
        including a first unwind record for the procedure in the stack unwind data structure, and
        determining whether the procedure complies with a default condition for at least a first characteristic of the procedure and, if so, then omitting a descriptor record from the first unwind record and, if not, then including a descriptor record within the first unwind record, the descriptor record describing a variance of the procedure from the default condition of the first characteristic; and
    if the procedure is a leaf procedure, then omitting the first unwind record for the procedure from the stack unwind data structure.

2. The method of claim 1 wherein the stack unwind data structure comprises a stack unwind table and an information block table, wherein the descriptor record is included within an unwind information block, for the procedure, in the information block table.

3. The method of claim 2 wherein the first unwind record includes an entry in the stack unwind table for the procedure that references the unwind information block.

4. The method of claim 1 wherein the stack unwind data structure comprises a stack unwind table and an information block table, wherein omitting the first unwind record for the procedure from the stack unwind data structure comprises omitting an entry from the stack unwind table.

5. The method of claim 1 including identifying the first unwind record as a predetermined record type, and encoding the first unwind record according to a predetermined encoding scheme.

6. The method of claim 5 wherein the first unwind record is a variable-length record.

7. A method of performing a stack unwind operation utilizing a stack unwind data structure, the method including:
    determining whether an entry for a procedure is included within the stack unwind data structure;
    if an entry for the procedure is included within the stack unwind data structure, then determining whether a descriptor record for a predetermined characteristic is included within the entry;
    if no descriptor record for the first predetermined condition is included within the entry, then attributing a default condition to the predetermined characteristic; and
    if no entry for the procedure is included within the stack unwind data structure, then identifying the procedure as a leaf procedure.

8. A computer-readable medium having a sequence of instructions stored thereon which, when executed by a processor, cause the processor to perform the steps of:

determining whether a procedure within a computer program is a leaf procedure;

if the procedure is not a leaf procedure, then:

including a first unwind record for the procedure in the stack unwind data structure, and         determining whether the procedure complies with a default condition for at least a first characteristic of the procedure and, if so, then omitting a descriptor record from the first unwind record and, if not, then including a descriptor record within the first unwind record, the descriptor record describing a variance of the procedure from the default condition of the first characteristic; and     if the procedure is a leaf procedure, then omitting the first unwind record for the procedure from the stack unwind data structure.

9. A computer-readable medium having a sequence of instructions stored thereon which, when executed by a processor, cause the processor to perform the steps of:

determining whether an entry for a procedure is included within the stack unwind data structure;

if an entry for the procedure is included within the stack unwind data structure, then determining whether a descriptor record for a predetermined characteristic is included within the entry;

if no descriptor record for the first predetermined condition is included within the entry, then attributing a default condition to the predetermined characteristic; and     if no entry for the procedure is included within the stack unwind data structure, then identifying the procedure as a leaf procedure.

\* \* \* \* \*